United States Patent [19]

Bridigum

[11] 4,045,093
[45] Aug. 30, 1977

[54] DYNAMIC BLENDING WITH A SPRING-APPLIED FLUID PRESSURE RELEASED SERVICE BRAKE INCLUDING COJOINT SPRING AND FLUID PRESSURE EMERGENCY FEATURE

[75] Inventor: Robert J. Bridigum, Plum Borough, Pa.

[73] Assignee: Westinghouse Air Brake Company, Wilmerding, Pa.

[21] Appl. No.: 740,836

[22] Filed: Nov. 11, 1976

[51] Int. Cl.$^2$ ............................................. B60T 13/74
[52] U.S. Cl. ......................................... 303/3; 188/15; 303/71; 192/2
[58] Field of Search .................. 303/3, 6 M, 9, 15, 20, 303/71; 188/170; 192/2

[56] References Cited

U.S. PATENT DOCUMENTS

| | | | |
|---|---|---|---|
| 2,897,011 | 7/1959 | Cotter | 303/20 X |
| 3,260,331 | 7/1966 | Borman, Jr. | 188/170 X |
| 3,536,360 | 10/1970 | Engle | 303/20 X |
| 3,814,483 | 6/1974 | Coiner et al. | 303/3 |

FOREIGN PATENT DOCUMENTS

| | | | |
|---|---|---|---|
| 1,063,078 | 3/1967 | United Kingdom | 188/170 |

*Primary Examiner*—George E. A. Halvosa
*Attorney, Agent, or Firm*—W. F. Poore; R. W. McIntire, Jr.

[57] ABSTRACT

This invention relates to a vehicle brake apparatus wherein a service brake application is effected by a spring in response to the reduction of the pressure of fluid in a first chamber on one side of a brake-applying piston, and an emergency brake application is effected by the establishment of a fluid pressure in a second chamber on the other side of this piston whereby this other side of the piston is subject simultaneously to both the fluid pressure force thus established and the force of the above-mentioned spring. A brake control valve device that includes a pair of self-lapping valve devices which respectively control the degree of reduction of the pressure of the fluid in the first chamber and the degree of pressure of fluid established in the second chamber, also comprises a spring-biased lever having a fulcrum adjustable according to the load on the vehicle and an operator-controlled device for rendering the spring-biased lever operable to so effect operation of the pair of self-lapping valve devices as to selectively effect a service or an emergency brake application and a subsequent brake release.

26 Claims, 3 Drawing Figures

Fig.1B 4,045,093

DYNAMIC BLENDING WITH A SPRING-APPLIED FLUID PRESSURE RELEASED SERVICE BRAKE INCLUDING COJOINT SPRING AND FLUID PRESSURE EMERGENCY FEATURE

BACKGROUND OF THE INVENTION

In U.S. Pat. No. 3,814,483, issued June 4, 1974 to Ronald W. Coiner et al. and assigned to the assignee of the present application, there is shown and described a blending valve device for a combined fluid pressure and dynamic vehicle brake apparatus wherein a brake-applying fluid pressure is established by a self-lapping valve device that is operable by a spring-biased lever, having a fulcrum adjustable according to the load on the vehicle, in response to a reduction in a dynamic braking effort, to provide a corresponding fluid pressure retarding force whereby the combined reducing dynamic braking effort and this fluid pressure retarding force provides a vehicle retarding force that is in accordance with the selected degree of operation of an operator-controlled brake control means. The brake apparatus disclosed in the above-mentioned United States Patent embodies means for enabling effecting only a limited emergency brake application.

Accordingly, it is the general purpose of this invention to provide a novel brake apparatus for an electrically-propelled vehicle having dynamic brakes wherein a spring disposed on one side of a brake-applying piston is effective, as the dynamic braking effort decreases, to transmit via the piston a service brake-applying force that is proportional to an operator-controlled reduction in the pressure of fluid in a chamber on the other side of the piston. An emergency brake-applying force is provided cojointly by this spring and the fluid-pressure-force resulting from an operator-controlled supply of fluid under pressure to the one side of the piston.

SUMMARY OF THE INVENTION

According to the present invention, a novel brake apparatus, for an electrically-propelled vehicle, comprises a spring that transmits to one side of a brake-applying piston a service braking force that is proportional to a reduction of the pressure of fluid in a chamber on the opposite side of this piston. This reduction of the pressure of the fluid is effected by operation of one of a pair of self-lapping valve devices which is so interlocked with the other valve device and a spring-biased lever, having a fulcrum adjustable according to the load on the vehicle, whereby an operator-controlled spring-biasing force transmitted to the lever causes rocking of this lever, as the dynamic braking effort decreases, to operate the one self-lapping valve device until a full service braking force is obtained. Thereafter additional operator-controlled rocking of this lever operates the other self-lapping valve device to supply fluid under pressure to the one side of the piston whereby the resulting fluid pressure force acting cojointly with the spring force transmits to the one side of the piston an emergency braking force that exceeds in degree the maximum service braking force.

DESCRIPTION

Referring to the drawings, an electrically-propelled vehicle brake apparatus embodying the invention comprises a brake pipe 1 that extends from end to end of the vehicle and back through each trailing vehicle that may be hauled thereby, a brake cylinder 2, a supply reservoir 3 that is charged from the brake pipe 1 via a first branch pipe 4 having therein a one-way check valve device 5, and a brake control valve device 6 which is connected to the brake pipe 1 by a second branch pipe 7.

The brake control valve device 6 has a sectionalized casing having five casing sections 8, 9, 10, 11 and 12 which are secured together by any suitable means (not shown).

The casing section 8 is provided at its upper end with a flat surface 8a to which, adjacent its right-hand end, is secured by any suitable means (not shown) a first brake transducer 13.

A second brake transducer 14 is secured by any suitable means (not shown) to the flat surface 8a adjacent the left-hand end thereof.

The upper end of the casing section 12 is provided with a flat surface 15 to which is secured by any suitable means (not shown) a third brake transducer 16, it being noted from the drawings that a flat face 17 provided on the lower end of the casing section 11 also abuts this flat surface 15 on the casing section 12 which flat surface 15 supports thereon the brake transducer 16.

The brake transducers 13, 14 and 16 are identical in construction. Hence, a description of one will suffice for all three. However, the elements of the second brake transducer 14 will be distinguished from those of the first brake transducer 13 by the addition of a prime (') to the numeral for each respective element of the transducer 14.

Likewise, the elements of the third brake transducer 16 will be distinguished from those of the first brake transducer 13 by the addition of a double prime (") to the numeral for each respective element of the transducer 16.

The brake transducer 13 comprises a body 18 having therein two parallel spaced-apart conduits or passageways 19 and 20 and a third conduit or passageway 21 which at one end opens into the passageway 20 intermediate the ends thereof and at its opposite end opens into a chamber 22 in which is disposed a filter element 23.

Disposed in the upper end of the passageway 20 is a bushing 24 and disposed in the right-hand end of passageway 21 is a bushing 25. The bushing 24 and a ball element 26 disposed in a chamber 27 constitute a variable area choke for controlling the rate of flow of fluid under pressure from the passageway 20 to the chamber 27 into which opens one end of the above-mentioned passageway 19 the opposite end of which is open to atmosphere.

The position of an armature plunger 28 of a solenoid 29 is adapted to control the amount or distance that the ball element 26 can move away from the upper end of the bushing 24 and is determined in accordance with the degree of electric current flowing through the magnet coil of this solenoid. The magnet coil of the solenoid 29 is connected by a pair of wires 30 and 31 to a portion of a dynamic brake resistor 32 that in turn is connected in a dynamic braking circuit which includes the armatures of the traction motors of the vehicle.

Likewise, the magnet coil of the solenoid 29' is connected by a pair of wires 30' and 31' to the dynamic brake resistor 32.

Figure 1A:
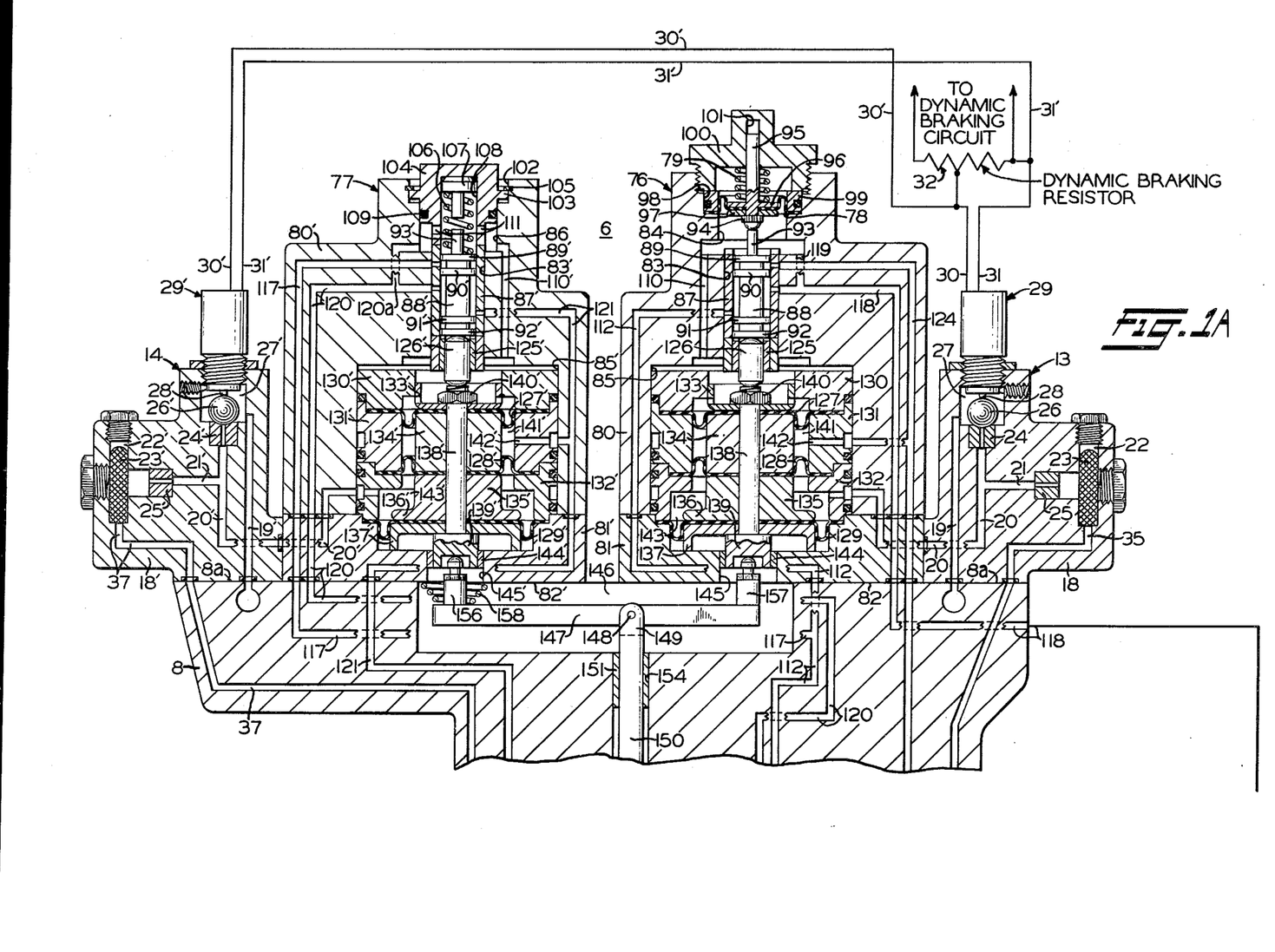
FIGS. 1A, 1B and 1C, when taken together such that the lower edge of FIG. 1A is matched with the upper edge of FIG. 1B and the left-hand edge of FIG. 1B is matched with the right-hand edge of FIG. 1C, constitute a diagrammatic view of a brake apparatus embodying the invention.
Figure 1B:
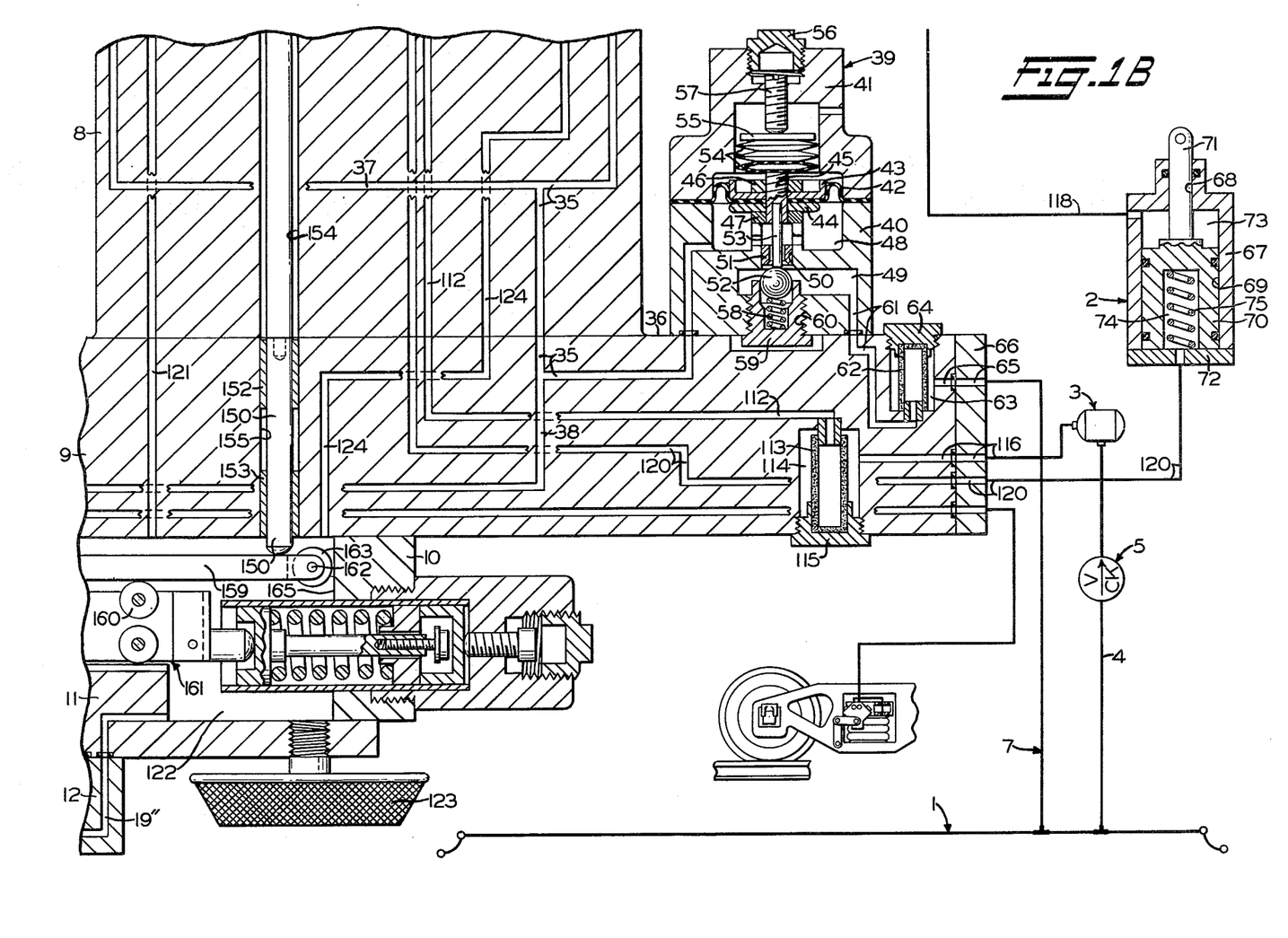
Figure 1C:
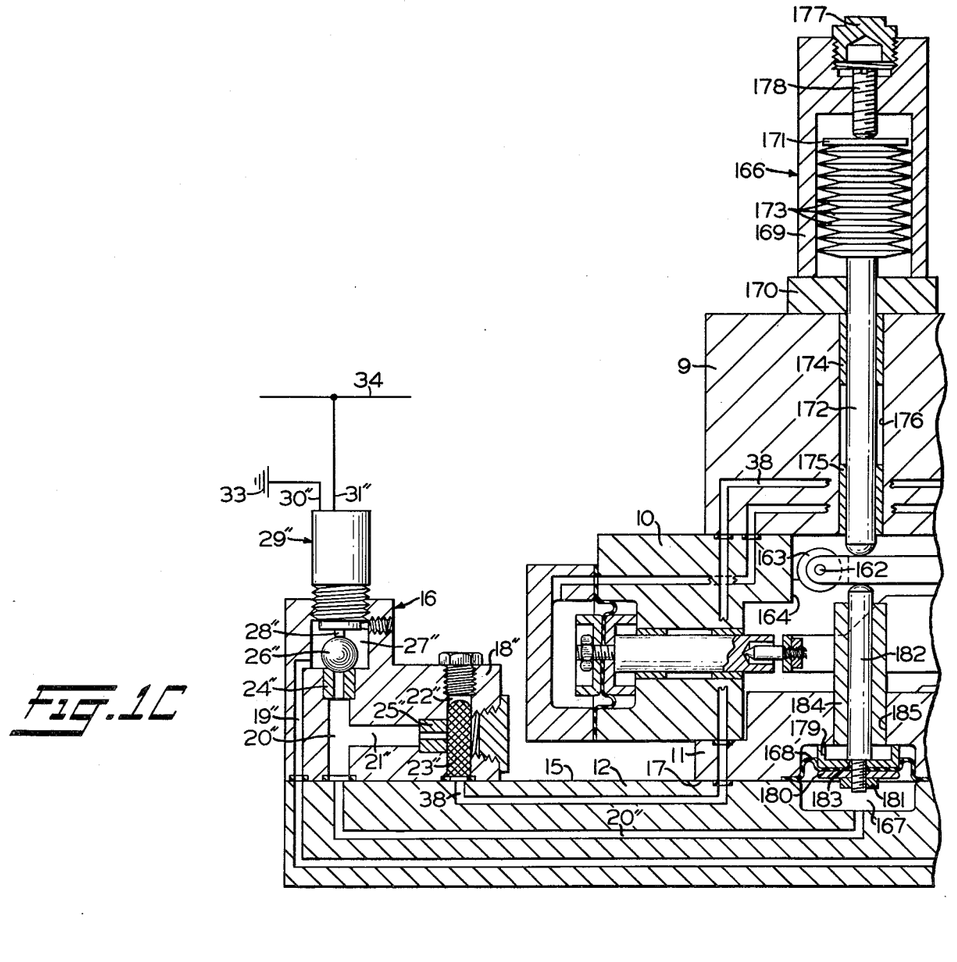

The magnet coil of the solenoid 29" is connected by a pair of wires 30" and 31" to respectively ground, as indicated in FIG. 1C by the reference numeral 33, and a wire 34 in which the degree of current flowing therein may be selectively varied by the operator of the vehicle in accordance with the degree of braking force desired to retard the vehicle.

As shown in FIGS. 1A and 1B of the drawings, opening into the lower end of the chamber 22 in the first brake transducer 13 is one end of a passageway 35 that extends through the body 18 of this brake transducer 13 and the casing sections 8 and 9 and at its other end opens at a flat surface 36 formed on the upper side of the casing section 9.

Likewise, opening into the lower end of the chamber 22' in the second brake transducer 14 is one end of a passageway 37 that extends through the body 18' of this brake transducer 14 and the casing section 8 and opens into that portion of the passageway 35 that extends through this casing section 8.

Furthermore, opening into the lower end of the chamber 22" in the third brake transducer 16 (FIG. 1C) is one end of a passageway 38 that extends through the body 18" of this brake transducer 16 and the casing sections 12, 11, 10, and 9 and opens into that portion of the passageway 35 that extends through the casing section 9. These passageways 35, 37 and 38 constitute supply conduits through which fluid under pressure is supplied to the respective brake transducers 13, 14 and 16 from a fluid pressure regulator 39 that is secured to the flat surface 36 by any suitable means (not shown).

Referring to FIG. 1B, the fluid pressure regulator 39 comprises a valve body 40 and a cup-shaped cover member 41 between which is secured the outer periphery of a diaphragm 42. The inner periphery of the diaphragm 42 is clamped between two annular diaphragm followers 43 and 44 by a threaded stem 45 and a pair of nuts 46 and 47 that have screw-threaded engagement with this stem 45 adjacent its respective opposite ends.

Formed in the body 40 are a pair of chambers 48 and 49 that are connected by a bore 50 into which is press-fitted a valve seat member 51. Extending through the valve seat member 51 and interposed between the lower end of the stem 45 and a ball-type valve 52 disposed in the chamber 49 is a valve stem 53. This valve stem 53 is effective to transmit a force to the valve 52 through the stem 45 and nut 46 from a plurality of Belleville springs 54 that are disposed in the cup-shaped cover member 41 and interposed between the stem 45 and an adjustable spring seat 55. The tension of the Belleville springs 54 may be adjusted by removing a screw-threaded plug 56 from the upper end of the cover member 41 and thereafter, by means such as a screw driver, rotating an adjusting screw 57 that has screw-threaded engagement with internal screw threads provided therefor in the cover member 41, to thereby move spring seat 55 up or down.

The Belleville springs 54 are effective, via stems 45 and 53, to unseat ball valve 52 from valve seat member 51 against the yielding resistance of a spring 58 that is interposed between this ball valve 52 and a cup-shaped screw-threaded plug 59 that has screw-threaded engagement with a screw-threaded bore 60 provided therefor in the body 40.

Opening into the chamber 48 is the other end of the hereinbefore-mentioned passageway 35, and opening into the chamber 49 is one end of a passageway 61 that extends through the body 40 and casing section 9 and at its opposite end opens into the interior of a filter 62. This filter 62 is interposed between the bottom of a chamber 63 formed in the casing section 9 and a screw-threaded plug 64 that closes the upper end of the chamber 63 into which chamber opens one end of a passageway 65. This passageway 65 extends through the casing section 9 and a pipe bracket 66 to which this casing section 9 is secured by any suitable means (not shown) and has the hereinbefore-mentioned second branch pipe 7 connected to its other end.

In view of the above, it is apparent that fluid under pressure flows from the brake pipe 1 (FIG. 1B) to the chamber 22 (FIG. 1A) in the first brake transducer 13 via the second branch pipe 7 (FIG. 1B), passageway 65, chamber 63, filter 62, passageway 61, chamber 49, past unseated ball valve 52, through valve seat member 51, chamber 48 and passageway 35. Since the chamber 22' in the second brake transducer 14 is connected to the passageway 35 by the passageway 37, and the chamber 22" (FIG. 1C) in the third brake transducer 16 is connected to the passageway 35 by the passageway 38, it is apparent that the chambers 22, 22' and 22" are all simultaneously charged with fluid under pressure from the brake pipe 1 until the pressure in the chamber 48 (FIG. 1B) beneath the diaphragm 42 is increased sufficiently to deflect this diaphragm 42 upward against the yielding resistance of the Belleville springs 54 until the spring 58 seats ball valve 52 on valve seat member 51 to cut off flow from chamber 49 to chamber 48. Thus the chambers 22, 22' and 22" are charged to a pressure determined by the tension of the Belleville springs 54 of the fluid pressure regulator 39.

As shown in FIG. 1B, the brake cylinder 2 comprises a cup-shaped body 67 that is provided with a bore 68 and a coaxial counterbore 69. A cup-shaped piston 70 is slidably mounted in the counterbore 69 and has formed integral with the upper side thereof a piston rod 71 that extends through the bore 68.

The piston 70 cooperates with the cup-shaped body 67 and a pressure head 72 that closes the lower end of the counterbore 69 to form on the respective upper and lower sides of this piston 70 a pair of chambers 73 and 74.

Disposed in the chamber 74 and interposed between the cup-shaped piston 70 and the pressure head 72 is a heavy service brake-applying spring 75 that is effective to cause a service brake application on the vehicle in response to the release of fluid under pressure from the chamber 73 in a manner hereinafter made apparent. This spring 75 acting cojointly with a fluid pressure force established in the chamber 74, upon the simultaneous release of fluid under pressure from the chamber 73, is effective to cause an emergency brake application on the vehicle in a manner hereinafter described.

For controlling the supply and release of fluid under pressure to and from the chamber 73 in the brake cylinder 2, the brake control valve device 6 comprises a release relay valve device 76 (FIG. 1A).

Likewise, for controlling the supply and release of fluid under pressure to and from the chamber 74 (FIG. 1B) in the brake cylinder 2, the brake control valve device 6 comprises an emergency application relay valve device 77.

The relay valve devices 76 and 77 (FIG. 1A) are identical in construction except that the relay valve device 76 includes a diaphragm 78 that is not present in the relay valve device 77. Moreover, a spring 79 that is disposed above the diaphragm 78 is not present in the relay valve device 77.

Except as pointed out above, the relay valve devices 76 and 77 are identical. Hence, a description of the elements of one will suffice for the corresponding elements of the other. However, the elements of the emergency application relay valve device 77 will be distinguished from those of the release relay valve device 76 by the addition of a prime (') to the numeral for each respective corresponding element of the relay valve device 77.

Referring to FIG. 1A, the release relay valve device 76 comprises a sectionalized casing that has a pair of casing sections 80 and 81 which are secured together by any suitable means (not shown). The lower side of the casing section 81 is provided with a flat surface 82 that abuts the flat surface 8a on the casing section 8 thereby enabling the relay valve device 76 to be secured to this casing section 8 by any suitable means (not shown).

The casing section 80 is provided with a bore 83 that at its upper end opens into a coaxial counterbore 84 and at its lower end into a coaxial counterbore 85.

It should be noted that the upper end of the bore 83' in the casing section 80' of the relay valve device 77 opens into a coaxial counterbore 86 that is larger in diameter than the counterbore 84 in the casing section 80 of the relay valve device 76.

Press-fitted into the bore 83 is a bushing 87 in which is slidably mounted a spool-type valve 88 that adjacent its upper end is provided with a pair of spaced-apart collars or lands 89 and 90 of such a diameter as to have a sliding fit with the wall surface of the bushing 87. Adjacent its lower end, this spool valve 88 is provided with a second pair of spaced-apart collars or lands 91 and 92 that also are of such a diameter as to have a sliding fit with the wall surface of the bushing 87.

As shown in FIG. 1A, extending above the collar 89 of the spool valve 88 is a stem 93 the upper end of which abuts a nut 94 that has screw-threaded engagement with screw threads formed on the lower end of a stem 95 whereby this nut 94 is effective to clamp the inner periphery of the hereinbefore-mentioned diaphragm 78 between a diaphragm follower 96 that is integral with this stem 95 and a diaphragm follower plate 97.

The outer periphery of the diaphragm 78 is clamped between the bottom of a counterbore 98 that is coaxial with counterbore 84 and an annular member 99 that is disposed in this counterbore 98 and retained therein by a screw-threaded plug 100 that has screw-threaded engagement with internal screw threads provided therefor in the casing section 80. It will be noted that the hereinbefore-mentioned spring 79 is disposed in surrounding relation to the stem 95 that is guided in a bottomed bore 101 in this plug 100 and interposed between this plug and the diaphragm follower 96 so that it is effective to bias the nut 94 against the upper end of the stem 93.

Since the application relay valve device 77 has no diaphragm that is the counterpart of the diaphragm 78 in the release relay valve device 76, the hereinbefore-mentioned counterbore 86 in the casing section 80' of the application relay valve device 77 opens into a coaxial counterbore 102 of larger diameter in which is received an out-turned flange 103 that is integral with a closure member 104.

As shown in FIG. 1A, a snap ring 105 is inserted in a groove provided therefor in the wall surface of the counterbore 102 whereby this snap ring abuts the upper side of the flange 103 to prevent ejection of this closure member 104 by a spring 106 that is interposed between the collar 89' on the spool valve 88' and a spring seat 107 that is slidably mounted in a bottomed bore 108 provided therefor in the closure member 104.

As shown in FIG. 1A, the closure member 104 is provided intermediate its ends with a peripheral annular groove in which is disposed an O-ring seal 109 that forms a seal with the wall surface of the counterbore 86 to prevent leakage of fluid under pressure from this counterbore 86 to atmosphere.

In order to subject the respective opposite ends of the spool-type valve 88 to the same pressure and thereby balance this valve, the casing section 80 is provided with a passageway 110 that at its upper end opens at the wall surface of the bore 84 and at its lower end opens into the counterbore 85.

Likewise, in order to subject the respective opposite ends of the spool-type valve 88' to the same pressure, the casing section 80' is provided with a passageway 110' that at its upper end opens at the wall surface of the bore 86 and at its lower end opens into the counterbore 85'. It will be noted that the closure member 104 is provided adjacent its lower end with a plurality of radial ports 111, only two of which appear in FIG. 1A, that enable the flow of fluid under pressure from the interior of the bore 86 to the upper end of the spool-type valve 88'.

As shown in FIG. 1A, opening at the wall surface of the bushing 87, at a location that is just above the collar 91 on the valve 88 while this valve occupies the position shown in FIG. 1A, is one end of a supply passageway 112 that extends through the casing sections 80, 81, 8 and 9 and at its other end opens into the interior of a filter 113 (FIG. 1B). This filter 113 is disposed in a chamber 114 in the casing section 9 and is supported in a cup-shaped screw-threaded plug 115 that closes the lower end of the chamber 114 which is connected to the supply reservoir 3 by a passageway and correspondingly numbered pipe 116.

Moreover, as shown in FIG. 1A, opening at the wall surface of the bushing 87', at a location that is between the collars 89' and 90' on the valve 88', while this valve occupies the position shown in FIG. 1A, is one end of a supply passageway 117 that extends through the casing sections 80', 81' and 8 and opens into the supply passageway 112 intermediate the ends thereof. Consequently, the supply passageways 112 and 117 are both charged with fluid under pressure from the supply reservoir 3 (FIG. 1B) to the pressure carried therein.

As shown in FIG. 1A, opening at the wall surface of the bushing 87, at a location that is above the location at which the one end of the supply passageway 112 opens at this wall surface and below the collar 90 on the spool-type valve 88, is one end of a delivery passageway 118 that extends through this bushing 87 and the casing sections 80, 81, and 8 and is connected by a correspondingly numbered pipe to the chamber 73 (FIG. 1B) in the brake cylinder 2 above the piston 70.

As is also shown in FIG. 1A, opening at the wall surface of the counterbore 84 is one end of a passageway 119 that extends through the casing section 80 and opens into the delivery passageway 118 intermediate the ends thereof. Accordingly, it is apparent that this passageway 119, the counterbore 84 and the passageway 110 enable the respective opposite ends of the spool valve 88 to be subject to the pressure in the delivery passageway 118 thereby balancing this spool valve.

Referring to the application relay valve device 77, it will be seen that opening at the wall surface of the bushing 87', at a location that is a short distance below the collar 90' on the valve 88' while this valve 88' occupies the position shown in FIG. 1A, is one end of a delivery passageway 120 that extends through the casing sections 80', 81', 8 and 9 and is connected by a correspondingly numbered pipe to the chamber 74 (FIG. 1B) in the brake cylinder 2.

A branch passageway 120a opens at one end into the passageway 120 intermediate the ends thereof and at the opposite end at the wall surface of the counterbore 86. Accordingly, it is apparent that the branch passageway 120a, counterbore 86, and passageway 110' enable the respective opposite ends of the spool valve 88' to be subject to the pressure in the delivery passageway 120 thereby balancing this spool valve 88.

Also opening at the wall surface of the bushing 87', at a location that is below the location at which the one end of the delivery passageway 120 opens at this wall surface and just above the collar 91' on the valve 88' while this valve 88' occupies the position shown in FIG. 1A, is one end of an exhaust passageway 121 that extends through the casing sections 80', 81', 8, and 9 and opens into a chamber 122 (FIG. 1B) in the casing section 10 which chamber 122 is open to atmosphere via an insect excluder device 123.

The release relay valve device 76 (FIG. 1A) is provided with an exhaust passageway 124 that at one end opens at the wall surface of the bushing 87 at a location that is between the collars 89 and 90 on the spool valve 88 while this valve 88 occupies the position shown in FIG. 1A. This passageway 124 extends through the casing sections 80, 81, 8 and 9 and opens into the chamber 122 (FIG. 1B) which is open to atmosphere via the insect excluder device 123.

As shown in FIG. 1A, press-fitted into the lower end of the bores 83 and 83' bushings 87 and 87' are short bushings that in turn have mounted therein guide bushings 125 and 125' in which are slidably mounted pusher pins 126 and 126'.

Since movement of the pusher pins 126 and 126' and corresponding spool valves 88 and 88' is controlled by identical diaphragm stacks, a description of one will suffice for both. However, the elements of the diaphragm stack for operating the pusher pin 126' and spool valve 88' will be denoted by the addition of a prime (') to the numeral for each respective element of this diaphragm stack.

The diaphragm stack for controlling movement of the pusher pin 126 and spool valve 88 comprises two diaphragms 127 and 128 that have the same effective area and a third diaphragm 129 that has an effective area that is greater than that of the diaphragms 127 and 128.

The diaphragms 127 and 128 are oppositely arranged, as shown in FIG. 1A.

The outer periphery of the diaphragm 127 is clamped between a pair of annular members 130 and 131 that have substantially the same diameter as counterbore 85 in which these annular members are disposed, and the outer periphery of the diaphragm 128 is clamped between the annular member 131 and a third annular member 132 that also has substantially the same diameter as the counterbore 85 in which it is disposed.

The outer periphery of the larger diaphragm 129 is clamped between the annular member 132 and the casing section 81 against the top of which rests the annular member 132. Thus, it is apparent that the casing section 81 supports all three of the annular members 130, 131 and 132.

The inner periphery of the diaphragm 127 is disposed between an annular U-shaped diaphragm follower 133 that is slidably guided in the annular member 130 and an annular diaphragm follower plate 134 between which and a second annular diaphragm follower plate 135 is disposed the inner periphery of the diaphragm 128.

The annular diaphragm follower plate 135 is provided at its lower end with an out-turned flange 136 between which and an annular U-shaped diaphragm follower 137 is disposed the inner periphery of the larger diaphragm 129.

Extending through the diaphragm follower 137, diaphragm 129, diaphragm follower plate 135, diaphragm 128, diaphragm follower plate 134, diaphragm 127 and diaphragm follower 133 is a bolt 138 that has a cylindrical head 139 formed integral with its lower end and at its upper end is provided with screw threads for receiving a nut 140 that when tightened serves to clamp the inner periphery of the three diaphragms 127, 128 and 129 to their respective diaphragm followers and diaphragm follower plates thereby forming a diaphragm stack.

In order that a chamber 141 formed between the diaphragms 127 and 128 be constantly open to atmosphere, a passageway 142 that opens at one end into this chamber 141 extends through the annular member 131 and the casing section 80 of the release relay valve device 76 and opens at its opposite end into the exhaust passageway 124 in this valve device 76.

Likewise, the chamber 141' between the diaphragms 127' and 128' of the application relay valve device 77 is constantly open to atmosphere by a passageway 142' that at one end opens into this chamber 141' and at its opposite end opens into the exhaust passageway 121 in this valve device 77.

The diaphragms 128 and 129, annular member 132, and annular diaphragm follower plate 135 cooperate to form a chamber 143 into which opens the hereinbefore-mentioned passageway 20 that extends through the body 18 of the brake transducer 13, casing sections 81 and 80 and the third annular member 132.

Likewise, opening into the chamber 143' in the application relay valve device 77 is the hereinbefore-mentioned passageway 20' that extends through the body 18' of the brake transducer 14, casing sections 81' and 80' and the third annular member 132'.

The round head 139 of bolt 138 is slidably mounted in a wear bushing 144 that is press-fitted into a bore 145 that extends through the casing section 81 and opens into a rectangular cavity 146 formed in the casing section 8 and extending inward from the flat surface 8a provided on the upper end of this casing section 8.

As shown in FIG. 1A, a lever 147 is disposed in the rectangular cavity 146 and is pivotally mounted intermediate its ends on such as a pin 148 that has its opposite ends anchored in the jaws of a clevis 149 that is formed at the upper end of a member or rod 150. This rod 150 slidably extends through three wear bushings 151, 152 and 153 into the chamber 122, the bushing 151 being press-fitted into a bore 154 that extends vertically through the casing section 8 and the bushings 152 and 153 (FIG. 1B) being press-fitted into a coaxial bore 155 in the casing section 9.

As shown in FIG. 1A, secured to the respective opposite ends of the lever 147 are button-headed members 156 and 157, the button-headed member 156 engaging the round head 139' of the bolt 138' of the application relay valve device 77 and the button-headed member 157 engaging the round head 139 of the bolt 138 of the release relay valve device 76.

Disposed in the cavity 146 in surrounding relation to the button-headed member 156 and interposed between the lower end of the casing section 81' and the upper side of the lever 147 is a biasing spring 158. This spring 158 acts on the lever 147 in the direction tending to rock this lever 147 counterclockwise about the pin 148 and is of such strength as to oppose clockwise rocking of the lever 147 about the point of contact between the round head 139 and button-headed member 157 by upward movement of the rod 150 in a manner hereinafter explained until the release relay valve device 76 has been operated by counterclockwise rocking of the lever 147 about the point of contact between the round head 139' and button-headed member 156 by the upward movement of the rod 150 to release all fluid under pressure from the chamber 73 (FIG. 1B) in the brake cylinder 2 to atmosphere.

Therefore, subsequent to the release of all fluid under pressure from the chamber 73 to enable the spring 75 in the brake cylinder 2 to shift the piston 70 upward to cause a full service brake application, clockwise rocking of the lever 147 about the point of contact between the round head 139 and button-headed member 157 by upward movement of the rod 150 effects operation of the application relay valve device 77 to supply fluid under pressure to the chamber 74 (FIG. 1B) in the brake cylinder 2 thereby effecting an emergency brake application on the vehicle by the combined force of the spring 75 and the fluid pressure force acting upward on the piston 70 as a result of the supply of fluid under pressure to the chamber 74 by the application relay valve device 77.

As shown in FIG. 1B of the drawings, the lower end of the rod 150 abuts the upper side of a scale beam 159 adjacent the right-hand end of this beam. The beam 159 is rockable about an adjustable fulcrum in the form of a roller 160. This roller 160 is rotatably mounted on a carriage 161 of a load-weighing mechanism that is operable to position the roller 160 and carriage 161 with respect to the beam 159 in accordance with the load on the vehicle. This load-weighing mechanism may be the same in construction and operation as the load-weighing mechanism shown and described in the hereinbefore-mentioned U.S. Pat. No. 3,814,483. Therefore, a detailed description of this load-weighing mechanism is deemed unnecessary for an understanding of the present invention. Fluid under pressure for operating the load-weighing mechanism to cause shifting of the roller 160 and carriage 161 relative to the scale beam 159 may be obtained from an air spring that is interposed between a sprung and an unsprung part of the vehicle since the pressure in the air spring varies in accordance with the load carried on the sprung part of the vehicle.

As shown in FIGS. 1B and 1C, each end of the scale beam 159 is provided with a clevis in the jaws of which are anchored the opposite ends of one of a pair of pins 162. One of a pair of rollers 163 is rotatably mounted on each of these pins 162. As the scale beam 159 rocks about the fulcrum roller 160 in a manner hereinafter described, these rollers 163 roll along vertical surfaces 164 and 165 provided therefor on the casing section 10 thereby preventing undue friction between this scale beam 159 and the casing section 10.

The scale beam 159 is rockable counterclockwise about the roller 160 by a brake cylinder pressure adjusting device 166 shown in FIG. 1C in response to operation of the third brake transducer 16 to release fluid under pressure from a chamber 167 below a diaphragm 168.

As shown in FIG. 1C, the brake cylinder adjusting device 166 comprises a cup-shaped top housing 169 that is supported on a flat bottom housing 170 which is secured to the flat surface 36 on the upper side of the casing section 9 by any suitable means (not shown).

Disposed in the cup-shaped top housing 169 and interposed between a spring seat 171 and a stem 172 are a plurality of Belleville springs 173. The stem 172 slidably extends through a pair of wear bushings 174 and 175 that are press-fitted into a bore 176 in the casing section 9 and serves to transmit a force to the left-hand end of the scale beam 159 from the Belleville springs 173, it being understood that the force exerted by these springs may be varied by removing a screw-threaded plug 177 from the upper end of the top housing 169 and thereafter, by means such as a screw driver, rotating an adjusting screw 178 that has screw-threaded engagement with internal screw threads provided therefor in the housing 169 to move the spring seat 171 up or down.

As shown in FIG. 1C, the outer periphery of the above-mentioned diaphragm 168 is clamped between the casing sections 11 and 12. The inner periphery of this diaphragm 168 is clamped between a U-shaped diaphragm follower 179 and a diaphragm follower plate 180 by a nut 181 that has screw-threaded engagement with screw threads formed on a piston rod 182 below a shoulder 183 thereon against which rests the diaphragm follower 179.

The piston rod 182 extends through a wear bushing 184 that is press-fitted into a bore 185 in the casing section 11 and abuts the lower side of the scale beam 159, it being noted that this piston rod is coaxial with the stem 172 of the brake cylinder pressure adjusting device 166.

As shown in FIG. 1C, opening into the chamber 167 below the diaphragm 168 is one end of the hereinbefore-mentioned passageway 20" that extends through the body 18" of the third brake transducer 16 and the casing section 12. Therefore, it is apparent that the Belleville springs 173 in the brake cylinder adjusting device 166 are effective, via the stem 172, to rock the scale beam 159 counterclockwise about the roller 160 in response to operation of the brake transducer 16 in a manner hereinafter described to release fluid under pressure from the chamber 167 below the diaphragm 168 to atmosphere.

OPERATION

Initial Charging

The supply reservoir 3 (FIG. 1B) is charged from the brake pipe 1 via the branch pipe 4 and check valve device 5 to the pressure normally carried in the train brake pipe which may be, for example, one hundred pounds per square inch.

Fluid under pressure also flows from the brake pipe 1 to the chamber 48 below the diaphragm 42 of the fluid pressure regulator 39 via the second branch pipe 7, passageway 65, chamber 63, filter 62, passageway 61, chamber 49 and past the ball valve 52 which is held unseated by the Belleville springs 54 until the pressure in the chamber 48 increases sufficiently to deflect the diaphragm 42 upward against the yielding resistance of these springs whereupon the spring 58 will seat valve 52 to prevent further flow to the chamber 48.

Fluid under pressure supplied to the chamber 48 flows therefrom to atmosphere via passageway 35, filter 23 (FIG. 1A), bushing 25, passageways 21 and 20, bushing 24, past ball element 26, chamber 27 and passageway 19 in brake transducer 13. Therefore, there is no buildup of pressure in the chamber 143 in the release relay valve device 76.

Moreover, fluid under pressure supplied to the passageway 35 also flows to atmosphere via passageway 37 (FIGS. 1B and 1A) filter 23', bushing 25', passageways 21' and 20', bushing 24', past ball element 26', chamber 27' and passageway 19' in the second brake transducer 14. Therefore, there is no buildup of pressure in the chamber 143' in the application relay valve device 77.

Accordingly, the spring 106 is effective to bias the spool valve 88' to the position shown in FIG. 1A. Therefore, while the valve 88' occupies the position shown in FIG. 1A, the chamber 74 (FIG. 1B) in the brake cylinder 2 is vented to atmosphere via pipe and passageway 120, the annular chamber between the wall surface of the bushing 87' (FIG. 1A) and that portion of the valve 88" between the collars 90' and 91' thereon, exhaust passageway 121, chamber 122 (FIG. 1B) and insect excluder device 123.

Since there is no buildup of pressure in the chamber 143 (FIG. 1A) in the release relay valve device 76, as explained above, the spring 79 is effective via diaphragm follower 96, nut 94 and stem 93 to bias the spool valve 88 to the position shown in FIG. 1A. While the spool valve 88 occupies the position shown in FIG. 1A, fluid under pressure can flow from the supply reservoir 3 (FIG. 1B) to the chamber 73 in the brake cylinder 2 via pipe and passageway 116, chamber 114, filter 113, passageway 112, the annular chamber between the wall surface of the bushing 87 (FIG. 1A) and that portion of the valve 88 between the collars 90 and 91 thereon, and passageway and pipe 118.

Since the chamber 74 (FIG. 1B) is vented to atmosphere, as explained above, the fluid under pressure thus supplied to the chamber 73 moves the piston 70 and piston rod 71 downward against the yielding resistance of the spring 75 until the lower end of the piston 70 abuts the pressure head 72 thereby releasing the spring-applied brake.

It will be noted from FIG. 1A that some of the fluid under pressure supplied to the passageway 118 flows to the interior of the counterbore 84 above the spool valve 88 and the lower side of the diaphragm 78 via the passageway 119, and that fluid under pressure also flows to the lower end of the spool valve 88 via the passageway 110. Thus, the opposite ends of the spool valve 88 are subject to delivery pressure in passageway 118 and the valve 88 is thereby balanced.

Moreover, the fluid under pressure supplied through the passageway 110 acts on the effective area of the upper side of the diaphragm 127 to maintain the diaphragm stack comprising diaphragms 127, 128 and 129 in the position shown in FIG. 1A.

While the brakes are released, a maximum amount of current flows through the wire 34 (FIG. 1C) so that the plunger 28" of the solenoid 29" exerts a maximum downward force on the ball element 26" to force it against the upper end of the bushing 24" to thereby prevent any flow of fluid under pressure from the passageway 20" to the atmospheric passageway 19".

It will be understood that the inside diameter of the bushings 24, 24' and 24" are very small and may be, for example, 0.113 inch. Likewise, the inside diameter of the bushings 25, 25' and 25" are very small and may be, for example, 0.013 inch. Therefore, the amount of fluid under pressure flowing to atmosphere via the bushings 24 and 24' and past ball elements 26 and 26' in the manner explained above is very minute. Accordingly, fluid under pressure will flow from the delivery chamber 48 of the fluid pressure regulator 39 (FIG. 1B) to the chamber 167 (FIG. 1C) below diaphragm 168 via passageways 35 and 38, filter 23", bushing 25", which constitutes a choke, passageway 21" and passageway 20" to cause an increase in the pressure of the fluid in this chamber 167. It will be understood that the pressure in the chamber 167, at the time that the spring 58 (FIG. 1B) moves the ball valve 52 upward against valve seat member 51 to cut off further flow of fluid under pressure to this chamber 167 (FIG. 1C), is such that this pressure of fluid acting upward on the effective area of the lower side of the diaphragm 168 establishes a fluid pressure force that is equal and opposite to the force of the plurality of Belleville springs 173 in the brake cylinder pressure adjusting device 166. Consequently, the force of these Belleville springs 173 that is transmitted to the scale beam 159 via the stem 172 is balanced by the fluid pressure force that is transmitted to this scale beam 159 via the piston rod 182.

Accordingly, it is apparent that while the brakes are released, the scale beam 159 is maintained in the horizontal position in which it is shown in FIGS. 1B and 1C.

With the scale beam 159 maintained in the horizontal position shown and the diaphragm follower 137 (FIG. 1A) in the release relay valve device 76 maintained in abutting relationship with the casing section 81 by fluid under pressure acting on the upper side of diaphragm 127, it is apparent that the lever 147 and the rod 150 will occupy the position in which they are shown in the drawings.

SERVICE BRAKE APPLICATION

Let it be assumed that the brake apparatus shown in FIGS. 1A, 1B and 1C is the brake apparatus on a vehicle that is not provided with dynamic brakes or, in other words, with no means for connecting the traction motors into a dynamic braking circuit that includes the dynamic brake resistor 32 (FIG. 1A). Therefore, the brake transducers 13 and 14 are inoperative.

To effect a service brake application on this vehicle that is not provided with dynamic brakes, the current flowing in the wire 34 (FIG. 1C) is reduced to a degree corresponding to the degree of the brake application desired.

As the current flowing in the wire 34 is reduced, the force transmitted to the ball element 26" by the plunger 28" of the solenoid 29" is correspondingly reduced. As the force transmitted to the ball element 26" is thus reduced, the fluid under pressure present in the passageway 20" will shift the ball element 26" upward and away from the upper end of the bushing 24" an amount corresponding to the degree of reduction of the current flowing in the wire 34.

When the ball element 26" is thus shifted upward, the fluid under pressure supplied by the fluid pressure regulator 39 (FIG. 1B) to the chamber 167 (FIG. 1C) via the bushing 25" which constitutes a choke, may flow from this chamber 167 to atmosphere via passageway 20", bushing 24" which constitutes a choke, past ball element 26", chamber 27", passageway 19"', chamber 122 (FIG. 1B) and insect excluder device 123.

When the ball element 26" is moved away from the upper end of the bushing 24" far enough for the rate of flow of fluid under pressure from the chamber 167 to atmosphere to exceed the rate of flow of fluid under pressure through the choke or bushing 25", the pressure in the chamber 167 will be reduced.

From the foregoing it is apparent that the pressure in the chamber 167 is reduced in accordance with the degree of brake application desired on the vehicle.

Referring to FIGS. 1B and 1C, it is apparent that as the pressure in the chamber 167 is reduced, the fluid pressure force transmitted to the lower side of the scale beam 159 via the piston rod 182 is correspondingly reduced.

Accordingly, it is apparent that as the force transmitted by the piston rod 182 to the lower side of the scale beam 159 is reduced, the force transmitted from the Belleville springs 173 in the brake cylinder pressure adjusting device 166 to the upper side of this scale beam 159 via the stem 172 is effective to rock the scale beam 159 counterclockwise about the roller 160 and effect upward shifting of the rod 150.

Since the spring 158 (FIG. 1A) is interposed between the bottom of the casing section 81' and the upper side of the lever 147, this upward shifting of the rod 150, which is pivotally connected to the lever 147 by the pin 148, will effect counterclockwise rocking of this lever 147 about the upper end of button-headed member 156 which can slide in the direction of the left-hand relative to the round head 139' sufficiently to enable this rocking of the lever 147 by the rod 150 without causing binding of this rod 150 in the wear bushings 151, 152 and 153.

It is apparent from FIG. 1A that as the lever 147 is rocked counterclockwise, the button-headed member 157 secured to the right-hand end of this lever and abutting the round head 139 on the lower end of bolt 138 will shift this bolt 138, pusher pin 126 and spool valve 88 upward against the yielding resistance of the spring 79 until the force of this spring 79 balances the difference in the downwardly-acting force of the Belleville springs 173 in the brake cylinder pressure adjusting device 166 (FIG. 1C) and the upwardly-acting fluid pressure force of the fluid under pressure in the chamber 167 acting in an upward direction on the effective area of the lower side of the diaphragm 168. This upward shifting of the valve 88 (FIG. 1A) moves the collar 91 thereon to a position just above the location at which the supply passageway 112 opens at the wall surface of the bushing 87 thereby cutting off the supply of fluid under pressure from this supply passageway 112 to the delivery passageway 118.

Moreover, this upward shifting of the valve 88 moves the collar 90 thereon to a position just above the location at which the exhaust passageway 124 opens at the wall surface of the bushing 87 thereby establishing a communication between the passageways 118 and 124.

When communication is thus established between passageways 118 and 124, fluid under pressure is released from the chamber 73 (FIG. 1B) in the brake cylinder 2 to atmosphere via pipe and passageway 118, interior of the bushing 87 (FIG. 1A), passageway 124, chamber 122 (FIG. 1B) and insect excluder device 123.

Moreover, fluid under pressure will flow from the upper side of diaphragm 127 and the lower side of diaphragm 78 to atmosphere via counterbore 85, passageway 110, counterbore 84, passageways 119 and 118 and the pathway described above until the force of the spring 78, by reason of this release of fluid under pressure from the lower side of the diaphragm 78, is rendered effective to shift the valve 88, pusher pin 126 and the diaphragm stack, comprising diaphragms 127, 128 and 129, downward to a third or lap position in which the collar 90 on valve 88 closes the end of the passageway 124 opening at the wall surface of the bushing 87 and the collar 91 on this valve 88 closes the end of the passageway 112 opening at the wall surface of this bushing 87.

Referring to FIG. 1B, as fluid under pressure is released from the chamber 73 in the manner described above, the heavy spring 75 is rendered effective to shift the piston 70 and piston rod 71 upward to effect, via suitable brake rigging (not shown), a service brake application to a degree corresponding to the degree of reduction of current effected in the wire 34 (FIG. 1C).

Let it now be assumed that the brake apparatus shown in FIGS. 1A, 1B and 1C is the brake apparatus on a vehicle that is provided with dynamic brakes. Therefore, it may be assumed that this vehicle is provided with suitable means that enables an operator of the vehicle to connect the traction motors into a dynamic braking circuit that includes the dynamic brake resistor 32 (FIG. 1A) simultaneously as he reduces the current flowing in the wire 34 (FIG. 1C) to a degree corresponding to the degree of the brake application desired, it being understood that the resistance of this brake resistor 32 may be varied to correspond to the degree of reduction of the current in the wire 34.

As shown in FIG. 1A, the magnet coils of solenoids 29 and 29' are connected to the dynamic brake resistor 32. Therefore, as long as the dynamic brake is fully effective, sufficient current flows through the magnet coils of the solenoids 29 and 29' to enable the plungers 28 and 28' to maintain the ball elements 26 and 26' seated against the upper end of the bushings 24 and 24'. Therefore, no fluid under pressure can flow from the passageways 20 and 20' to atmosphere via the exhaust passageways 19 and 19'.

In view of the above, it is apparent that the chambers 143 and 143' remain fully charged with fluid under pressure supplied thereto from the fluid pressure regulator 39 in the manner hereinbefore explained. Therefore, the spring 79 is effective to maintain the spool valve 88 in the position shown in FIG. 1A so that fluid under pressure flows from the supply passageway 112 to the chamber 73 (FIG. 1B) via the passageway and pipe 118. Likewise, the spring 106 is effective to maintain the spool valve 88' in the position shown in FIG. 1A so that the chamber 74 (FIG. 1B) is vented to atmosphere via the pipe and passageway 120, the passageway 121 (FIG. 1A) that is connected to this passageway 120 by the spool valve 88', chamber 122 (FIG. 1B) and the insect excluder device 123.

Accordingly, the fluid under pressure supplied to the chamber 73 is effective to hold the heavy spring 75 compressed thereby maintaining the spring-applied brake released so long as the dynamic brake is fully applied.

It is well known that as the speed of the vehicle reduces, the dynamic braking effort is correspondingly reduced.

Therefore, it will be understood that as the speed of the vehicle reduces, the dynamic braking effort is correspondingly reduced. Accordingly, the amount of current flowing in the dynamic brake resistor 32 and, therefore, in the magnet coils of the solenoids 29 and 29', is correspondingly reduced.

This reduction in the amount of current flowing in the magnet coils of the solenoids 29 and 29' correspondingly reduce the force with which the plungers 28 and 28' press the ball elements 26 and 26' against the upper end of the bushings 24 and 24'.

As the force on the ball elements 26 and 26' is thus reduced, the fluid under pressure in the passageways 20 and 20' is effective to move these ball elements 26 and 26' upward away from the ends of the bushings 24 and 24' whereupon fluid under pressure is released from the chambers 143 and 143' to atmosphere via the exhaust passageways 19 and 19' faster than fluid under pressure can flow through the bushings 25 and 25' which constitute supply chokes. Consequently, the pressure in the chambers 143 and 143' will be reduced.

The above-mentioned reduction in the amount of current flowing in the wire 34 (FIG. 1C) enables the release of fluid under pressure from the chamber 167 to atmosphere in the same manner as explained above for the chambers 143 and 143'.

This release of fluid under pressure from the chamber 167 reduces the fluid pressure force transmitted via the piston rod 182 to the lower side of scale beam 159.

Therefore, as the force transmitted by the piston rod 182 to the lower side of the scale beam 159 is reduced, the Belleville springs 173 in the brake cylinder pressure adjusting device 166 are rendered effective, via stem 172, to rock the scale beam 159 counterclockwise about the roller 160 and thereby shift the rod 150 in an upward direction.

Since the spring 158 (FIG. 1A) is interposed between the lower side of the casing section 80' and the upper side of the lever 147, it is apparent that as the rod 150, which is pivotally connected to lever 147 by pin 148, is shifted in an upward direction, in the manner described above, it will effect counterclockwise rocking of the lever 147 about its left-hand end.

This counterclockwise rocking of the lever 147 is effective, via the button-headed member 157 secured to the right-hand end of this lever, to shift bolt 138, pusher pin 126 and spool valve 88 upward against the yielding resistance of the spring 79, it being remembered that at this time fluid under pressure is being released from the chamber 143 above diaphragm 129 in the manner explained above.

As the spool valve 88 is thus moved upward, the collar 91 thereon will move to a position just above the location at which the passageway 112 opens at the wall surface of the bushing 87, and the collar 90 on this valve 88 will move to a position just above the location at which the exhaust passageway 124 opens at the wall surface of this bushing 87.

Consequently, the passageway and pipe 118 is disconnected from the supply passageway 112 is connected to the exhaust passageway 124. Therefore, fluid under pressure will now be released from the chamber 73 (FIG. 1B) to atmosphere.

Moreover, fluid under pressure will flow from the upper side of the diaphragm 127 (FIG. 1A) and the lower side of the diaphragm 78 to the exhaust passageway 124 via passageways 110 and 119 until the pressure below the diaphragm 78 is reduced sufficiently for the spring 79 to shift the spool valve 88 downward to a third or lap position to cut off further release of fluid under pressure from the chamber 73 (FIG. 1B) to atmosphere.

Referring to FIG. 1B, it is apparent that as fluid under pressure is released from the chamber 73 in the brake cylinder 2, the heavy spring 75 is rendered effective to shift the piston 70 and piston rod 71 in an upward direction to effect a spring-applied service brake application on the vehicle.

From the foregoing, it is apparent that as the dynamic braking effort fades away thereby reducing the current flowing through the magnet coil of solenoid 29 (FIG. 1A); fluid under pressure is released from the chamber 143 whereupon the above-mentioned upward shifting of the rod 150 will cause operation of the release relay valve device 76 to release fluid under pressure from the chamber 73 (FIG. 1B) in the brake cylinder 2 to enable the spring 75 to shift piston 70 and piston rod 71 upward to effect a spring-applied service brake application on the vehicle, the degree of which corresponds to the degree of reduction of the dynamic braking effort. Thus, as the dynamic brake fades away in response to the reduction in speed of the vehicle, the braking force of the spring-applied brake is increased. Therefore, the degree of braking on the vehicle, as called for by the amount of reduction of the current flowing in the wire 34, is maintained constant notwithstanding fading away of the dynamic braking effort.

RELEASE OF A SERVICE BRAKE APPLICATION

To release a service brake application, the current flowing in the wire 34 (FIG. 1C) will be increased to its former normal value prior to effecting the service brake application.

Upon increasing the current flowing in the wire 34 to its former value, the force transmitted to the ball element 26" by the plunger 28" of the solenoid 29" is correspondingly increased to its former value so that the ball element 26" is pressed against the upper end of the bushing 24" with sufficient force to prevent flow of fluid under pressure from the passageway 20" to the passageway 19" which is open to atmosphere. Therefore, the fluid under pressure supplied through the bushing 25", which constitutes a supply choke, from the regulator 39 (FIG. 1B) will flow through the passageway 20" (FIG. 1C) to the chamber 167 to increase the pressure therein and, therefore, the fluid pressure force acting in an upward direction on the piston rod 182.

As the fluid pressure force acting in an upward direction on the piston rod 182 is thus increased, it acts in opposition to the force of the Belleville springs 173 in the brake cylinder pressure adjusting device 166 and transmitted to the scale beam 159 via the stem 172. Therefore, this increasing fluid pressure force on the piston rod 182 is effective to overcome the force of the springs 173 and rock the scale beam 159 clockwise about the roller 160 until this scale beam is returned to the position shown in the drawings.

As the scale beam 159 is thus rocked clockwise to the position shown in the drawings, the spring 79 (FIG. 1A) is rendered effective, via nut 94 and stem 93, to shift the spool valve 88, plunger pin 126 and the diaphragm stack comprising diaphragms 127, 128 and 129 downward to the position shown in FIG. 1A.

Upon the return of the valve 88 to the position shown in FIG. 1A, a communication is established between the supply passageway 112 and delivery passageway 118. Therefore, fluid under pressure will flow from the supply reservoir 3 (FIG. 1B) to the chamber 73 in the brake cylinder 2. This supply of fluid under pressure to the chamber 73 will increase the pressure acting on the upper side of the piston 70 and shift this piston 70 and the piston rod 71 downward against the yielding resistance of the spring 75 to the position shown thereby releasing the spring-applied brake application on the vehicle.

It will be noted from FIG. 1A that some of the fluid under pressure supplied to the delivery passageway 118 flows therefrom to the lower side of the diaphragm 78 and the upper side of the diaphragm 127 via the passageways 119 and 110 so that this fluid under pressure is effective to maintain the several elements of the release relay valve device 76 in the position shown in FIG. 1A upon the return of the scale beam 159 to the position in which it is shown in the drawings.

EMERGENCY BRAKE APPLICATION

When an emergency brake application is effected the dynamic brakes are cut out.

Moreover, when an emergency brake application is effected, the current flowing in the wire 34 (FIG. 1C) is reduced to zero.

When the current in the wire 34 is thus reduced to zero, the armature plunger 28" of the solenoid 29" will transmit no force to the ball element 26". Therefore, all of the fluid under pressure supplied through the bushing 25" from the regulator 39 (FIG. 1B) will flow to atmosphere via the bushing 24" (FIG. 1C) and atmospheric passageway 19". Accordingly, the pressure in the chamber 167 will be reduced to zero so that the piston rod 182 will transmit no force to the lower side of the scale beam 159.

When the fluid pressure force transmitted to the lower side of the scale beam 159 by the piston rod 182 is reduced to zero, the Belleville springs 173 in the brake cylinder pressure adjusting device 166 will effect counterclockwise rocking of the scale beam 159 about the roller 160 (FIG. 1B) to cause operation of the release relay valve device 76 (FIG. 1A) to release all fluid under pressure from the chamber 73 (FIG. 1B) in the brake cylinder 2.

It will be noted from FIG. 1A that when the spool valve 88 is moved to the position in which all fluid under pressure is released from the chamber 73 (FIG. 1B) in the brake cylinder 2, the upper end of the stem 95 (FIG. 1A) will abut the upper end of the bore 101 in the plug 100 in which this stem 95 is slidably mounted. Therefore, further upward shifting of the elements of the release relay valve device 76 by upward movement of the rod 150 and counterclockwise rocking of the lever 147 by this rod 150 is prevented.

Therefore, it is apparent that the point of contact between the button-headed member 157 and the round head 139 of bolt 138 become the fulcrum for the lever 147. Accordingly, as the rod 150 is further shifted upward in response to the reduction of the current in the wire 34 (FIG. 1C) to zero, it is apparent that the lever 147 is now rocked clockwise about its right-hand end against the yielding resistance of the spring 158 and also the spring 106.

As the lever 147 is rocked clockwise in the manner just explained, the button-headed member 156 carried on the left-hand end of this lever is shifted in an upward direction. Accordingly, a force is transmitted, via the bolt 138' and pusher pin 126' of the application relay valve device 77, to the spool valve 88' to shift this valve 88' upward until the upper end of the stem 93' abuts the lower end of the spring seat 107.

When the valve 88' is shifted to this upper position, a communication is established between the supply passageway 117 and the delivery passageway and pipe 120. Therefore, fluid under pressure will flow from the supply reservoir 3 (FIG. 1B) to the chamber 74 in the brake cylinder 2. Since all fluid under pressure has been released from the chamber 73 above the piston 70 in the manner described above, this piston 70 and the piston rod 71 will be now shifted upward by the combined force of the heavy spring 75 and the fluid pressure force acting on the lower side of the piston 70 to effect an emergency brake application on the vehicle.

It is apparent that the force transmitted to the piston rod 71 by the combined forces of the spring 75 and the fluid pressure force, as a result of the fluid under pressure supplied to the chamber 74 by operation of the application relay valve device 77, thus provides a greater braking force for braking the vehicle when an emergency brake application is effected than is provided solely by the spring 75 during a service brake application.

RELEASE OF AN EMERGENCY BRAKE APPLICATION

To release an emergency brake application, the current in the wire 34 (FIG. 1C) will be increased from zero to its former normal value.

When the current in the wire 34 is thus increased to its former normal value, the scale beam 159 will be returned to the position shown in the drawings in the manner hereinbefore explained.

As the scale beam 159 is returned to the position shown in the drawings, the release relay valve device 76 (FIG. 1A) will operate in the same manner as explained in connection with a brake release after a service brake application to again supply fluid under pressure from the supply reservoir 2 (FIG. 1B) to the chamber 73 in the brake cylinder 2.

Moreover, the spring 158 (FIG. 1A) will be rendered effective to shift the button-headed member 156 downward thereby removing the upwardly-acting force on the bolt 138' and pusher pin 126'. The spring 106 will now shift the valve 88' downward to the position shown thereby establishing a communication between the delivery passageway and pipe 120 and the exhaust passageway 121 whereupon the fluid under pressure in the chamber 74 (FIG. 1B) of the brake cylinder 2 will be released to atmosphere simultaneously as fluid under pressure is supplied to the chamber 73. Consequently, this fluid under pressure supplied to the chamber 73 will shift the piston 70 and piston rod 71 downward against the yielding resistance of the spring 75 until the piston 70 abuts the pressure head 72 thus releasing the emergency brake application.

Having now described the invention what I claim as new and desire to secure by Letters Patent, is:

1. A combined fluid pressure and spring-applied brake apparatus for controlling braking of a vehicle, said brake apparatus comprising;
   a. braking means including a brake cylinder having a piston and a spring for subjecting one side of said piston to the force of said spring to effect a service brake application in the absence of fluid under pressure on the other side,
   b. a source of fluid under pressure,
   c. a first valve means having one position in which fluid under pressure flows from said source of fluid under pressure to the other side of said piston to effect the compression of said spring and thereby a release of a service brake application, and a second position in which it prevents said flow and effects a release of fluid under pressure from said other side to atmosphere to enable said spring to effect a service brake application, d. a second valve means having one position in which fluid under pressure is released from said one side of said piston, and a second position in which fluid under pressure flows from said source of fluid under pressure to said one side whereby the fluid pressure force established thereby on said one side acting cojointly with said spring effects an emergency brake application in the absence of fluid under pressure on the other side, e. means so interlocking said first and second valve means as to prevent operation of said second valve means from its said one position to its said second position prior to operation of said first valve means from its said one position to its said second position, f. a spring-biased mechanical linkage so cooperating with said interlocking means as to enable said linkage to transmit sufficient force to effect successive shifting of said first and second valve means from their said one to their said second positions, and g. operator-controlled electro-pneumatic means for so controlling the force transmitted by said spring-biased mechanical linkage as to effect operation of only said first valve means or successively said first and said second valve means.

2. A combined fluid pressure and spring-applied brake apparatus, as recited in claim 1, further characterized in that said first valve means comprises;

a. biasing means normally effective to maintain said first valve means in its said one position in which fluid under pressure flows from said source of fluid under pressure to said other side of said piston and yieldingly resist shifting of said first valve means from its said one position to its said second position by said spring-biased mechanical linkage, and b. abutment means subject on one side to said biasing means and on the other side to the fluid under pressure delivered by said first valve means, while in its said one position, to said other side of said piston whereby a reduction in the pressure of the fluid on said other side of said piston and the other side of said abutment means responsive to shifting of said first valve means to its said second position by said spring-biased mechanical linkage renders said biasing means effective to establish a force substantially equal in magnitude and opposite in direction to the force transmitted by said spring-biased mechanical linkage to said first valve means whereby this force established by said biasing means shifts said first valve means from its said second position to a third position in which fluid under pressure is trapped on said other side of said piston thus enabling self-lapping operation of said first valve means to control the pressure of fluid on said other side of said piston.

3. A combined fluid pressure and spring-applied brake apparatus, as recited in claim 2, further characterized in that the vehicle is propelled by electric motors, and said braking means further includes a dynamic braking circuit to which said motors may be selectively connected to provide dynamic braking of the vehicle.

4. A combined fluid pressure and spring-applied brake apparatus, as recited in claim 3, further characterized in that said dynamic braking circuit comprises a dynamic brake resistor.

5. A combined fluid pressure and spring-applied brake apparatus, as recited in claim 4, further characterized in that said brake apparatus comprises;

a. fluid-pressure-operated abutment means for preventing shifting of said first valve means from its said one position to its said second position so long as a chosen pressure of fluid is maintained on said abutment means, b. conduit means through which fluid under pressure can flow from said source of fluid under pressure to said abutment means to establish said chosen pressure thereon, c. a bushing through which fluid under pressure may be released from said conduit means to atmosphere, d. an element movable toward and away from one end of said bushing to effect variations in the rate of flow of fluid under pressure from said conduit means to atmosphere thereby effecting corresponding reductions in the pressure of fluid acting on said abutment means, and e. a solenoid having an armature plunger for transmitting force to said movable element and a coil connected to said dynamic brake resistor whereby the reduction in the current flowing through said resistor, as the dynamic braking effort is reduced in response to a reduction in the speed of the vehicle, effects a corresponding reduction in the current flowing through said coil and thereby the force transmitted to said element by said armature plunger thereby enabling the cooperation between said element and said bushing to constitute a variable area choke through which fluid under pressure is released from said conduit means to atmosphere to reduce the pressure of fluid acting on said abutment means, f. said reduction of the pressure of the fluid acting on said abutment means enabling said spring-biased mechanical linkage to operate said first valve means in the manner of a self-lapping valve to release fluid under pressure from said other side of said piston to atmosphere thereby enabling said spring to increase the degree of the spring-applied service brake application on the vehicle as the current flowing through said dynamic brake resistor decreases.

6. A combined fluid pressure and spring-applied brake apparatus, as recited in claim 5, further characterized in that said fluid-pressure-operated abutment means comprises;

a. a first abutment having a certain effective area, b. a second abutment oppositely arranged with respect to said first abutment and having an effective area that is less than said certain effective area of said first abutment, said first and second abutments being so spaced apart that their adjacent sides form therebetween a first chamber to which fluid under pressure is supplied to establish therein said chosen pressure to prevent shifting of said first valve means from its said one to its said second position, c. a third abutment oppositely arranged with respect to said second abutment and having the same effective area as said second abutment, said second and third abutments being so spaced-apart that their adjacent sides form therebetween a second chamber that is constantly open to atmosphere, the other side of said third abutment being subject to the pressure on said other side of said piston whereby, upon a reduction of said chosen pressure in said first chamber to enable shifting of said first valve means from its said one position to its said second position, fluid under pressure is simultaneously released from said other side of said piston, said other side of said third abutment and said other side of said abutment means that is subject on its one side to said biasing means, to thereby enable said biasing means to simultaneously shift said first, second, and third abutments and said first valve means from said second position of said first valve means to the third position of said first valve means in which third position fluid at the same pressure is trapped on said other side of said piston, said other side of said third abutment and said other side of said abutment means.

7. A combined fluid pressure and spring-applied brake apparatus, as recited in claim 5, further characterized in that the inside diameter of said bushing is 0.113 inch.

8. A combined fluid pressure and spring-applied brake apparatus, as recited in claim 5, further characterized by a second bushing disposed in said conduit, the inside diameter of said second bushing being 0.0135 inch.

9. A combined fluid pressure and spring-applied brake apparatus, as recited in claim 4, further characterized in that said brake apparatus comprises;
 a. fluid-pressure-operated abutment means for preventing shifting of said second valve means from its said one position to its said second position so long as a chosen pressure of fluid is maintained on said abutment means,
 b. conduit means through which fluid under pressure can flow from said source of fluid under pressure to said abutment means to establish said chosen pressure thereon,
 c. a bushing through which fluid under pressure may be released from said conduit means to atmosphere,
 d. an element movable toward and away from one end of said bushing to effect variations in the rate of flow of fluid under pressure from said conduit means to atmosphere thereby effecting corresponding reductions in the pressure of fluid acting on said abutment means, and
 e. a solenoid having an armature plunger for transmitting force to said movable element and a coil connected to said dynamic brake resistor whereby the reduction in the current flowing through said resistor, as the dynamic braking effort is reduced in response to a reduction in the speed of the vehicle, effects a corresponding reduction in the current flowing through said coil and thus the force transmitted to said element by said armature plunger thereby enabling the cooperation between said element and said bushing to constitute a variable area choke through which fluid under pressure is released from said conduit means to atmosphere to reduce the pressure of fluid acting on said abutment means,
 f. said reduction in the pressure of the fluid acting on said abutment means enabling said spring-biased mechanical linkage to operate said second valve means, subsequent to operation of said first valve means, in the manner of a self-lapping valve to supply fluid under pressure from said source of fluid under pressure to said one side of said piston whereby the fluid pressure force established on said one side acts cojointly with the force of said spring to provide an emergency braking force for braking the vehicle.

10. A combined fluid pressure and spring-applied brake apparatus, as recited in claim 9, further characterized in that said fluid-pressure-operated abutment means comprises;
 a. a first abutment having a certain effective area,
 b. a second abutment oppositely arranged with respect to said first abutment and having an effective area that is less than said certain effective area of said first abutment, said first and second abutments being so spaced apart that their adjacent sides form therebetween a first chamber to which fluid under pressure is supplied to establish therein said chosen pressure to prevent shifting of said second valve means from its said one to its said second position, and
 c. a third abutment oppositely arranged with respect to said second abutment and having the same effective area as said second abutment, said second and third abutments being so spaced apart that their adjacent sides form therebetween a second chamber that is constantly open to atmosphere, the other side of said third abutment being normally subject to atmospheric pressure, whereby upon a reduction of said chosen pressure in said first chamber to enable shifting of said second valve means from its said one position to its said second position, fluid under pressure is simultaneously supplied to said one side of said piston and said other side of said third abutment, the resulting increase of pressure of fluid on said other side of said third abutment enabling the establishment of sufficient fluid pressure force to simultaneously shift said first, second and third abutments and said second valve means from second position of said second valve means to a third position of said second valve means in which third position fluid at the same pressure is trapped on said one side of said piston and said other side of said third abutment.

11. A combined fluid pressure and spring-applied brake apparatus, as recited in claim 9, further characterized in that the inside diameter of said bushing is 0.113 inch.

12. A combined fluid pressure and spring-applied brake apparatus, as recited in claim 9, further characterized by a second bushing disposed in said conduit, the inside diameter of said second bushing being 0.0135 inch.

13. A combined fluid pressure and spring-applied brake apparatus, as recited in claim 4, further characterized in that said brake apparatus comprises;
 a. a first fluid-pressure-operated abutment means for preventing shifting of said first valve means from its said one position to its said second position so long as a chosen pressure of fluid is maintained on said abutment means,
 b. a first conduit means through which fluid under pressure can flow from said source of fluid under pressure to said first abutment means to establish said chosen pressure thereon,
 c. a first bushing through which fluid under pressure may be released from said first conduit means to atmosphere,
 d. a first element movable toward and away from one end of said first bushing to effect variations in the rate of flow of fluid under pressure from said first conduit means to atmosphere thereby effecting corresponding reductions in the pressure of fluid acting on said first abutment means, e. a first solenoid having an armature plunger for transmitting force to said first movable element and a coil connected to said dynamic brake resistor whereby the reduction in the current flowing through said resistor, as the dynamic braking effort is reduced in response to a reduction in the speed of the vehicle, effects a corresponding reduction in the current flowing through said first coil and thereby the force transmitted to said first element by said first armature plunger thus enabling the cooperation between said first element and said first bushing to constitute a first variable area choke through which fluid under pressure is released from said first conduit means to atmosphere to reduce the pressure of fluid acting on said first abutment means, f. said reduction in the pressure of the fluid acting on said first abutment means enabling said spring-biased mechanical linkage to operate said first valve means in the manner of a self-lapping valve to release fluid under pressure from said other side of said piston to atmosphere thereby enabling said spring to increase the degree of the spring-applied service brake application on the vehicle as the current flowing through said dynamic brake resistor decreases, g. a second fluid-pressure-operated abutment means for preventing shifting of said second valve means from its said one position to its said second position so long as a chosen pressure of fluid is maintained on said second abutment means, h. a second conduit means through which fluid under pressure can flow from said source of fluid under pressure to said abutment means to establish said chosen pressure thereon, i. a second bushing through which fluid under pressure may be released from said second conduit means to atmosphere, j. a second element movable toward and away from one end of said second bushing to effect variations in the rate of flow of fluid under pressure from said second conduit means to atmosphere thereby effecting corresponding reductions in the pressure of fluid acting on said second abutment means, and k. a second solenoid having an armature plunger for transmitting force to said second movable element and a coil connected to said dynamic brake resistor whereby the reduction in the current flowing through said resistor, as the dynamic braking effort is reduced in response to a reduction in the speed of the vehicle, effects a corresponding reduction in the current flowing through said coil and thereby the force transmitted to said second element by said armature plunger thus enabling the cooperation between said second element and said second bushing to constitute a variable area choke through which fluid under pressure is released from said second conduit means to atmosphere to reduce the pressure of fluid acting on said second abutment means, l. said reduction in the pressure of the fluid acting on said second abutment means enabling said spring-biased mechanical linkage to operate said second valve means, subsequent to operation of said first valve means, in the manner of a self-lapping valve to supply fluid under pressure from said source of fluid under pressure to said one side of said piston whereby the fluid pressure force established on said one side acts cojointly with the force of said spring to provide an emergency braking force for braking the vehicle.

14. A combined fluid pressure and spring-applied brake apparatus, as recited in claim 1, further characterized in that said second valve means comprises;
 a. a valve element shiftable from said first to said second position, and
 b. biasing means acting on one end of said valve element to normally maintain it in its said one position in which fluid under pressure is released from said one side of said piston and effective to yieldingly resist shifting of said valve element by said spring-biased mechanical linkage from its said one position to its said second position in which fluid under pressure flows from said source of fluid under pressure to said one side of said piston and said one end of said valve element whereby the fluid under pressure supplied to said one end establishes a fluid pressure force that acts cojointly with the force of said biasing means to shift said valve element from its said second position to a third position in which fluid under pressure is trapped on said one side of said piston thus enabling self-lapping operation of said second valve means to control the pressure of fluid on said one side of said piston thereby enabling the establishment of varying degrees of emergency braking force.

15. A combined fluid pressure, and spring-applied brake apparatus, as recited in claim 1, further characterized in that said interlocking means comprises:
 a. a pivoted lever so disposed with respect to said first and second valve means as to effect shifting of said first valve means from its one position to its said second position in response to rocking of said lever in one direction and shifting of said second valve means from its one position to its second position in response to rocking of said lever in [one direction and shifting of said second valve means from its one position to its second position in response to rocking of said lever] a direction opposite said one direction, and
 b. biasing means so disposed with respect to said lever as to prevent rocking thereof in said direction opposite said one direction prior to rocking of said lever in said one direction whereby said first and second valve means are shifted from their one position to their second position successively by said force transmitted to said lever by said spring-biased mechanical linkage.

16. A combined fluid pressure and spring-applied brake apparatus, as recited in claim 1, further characterized in that said spring-biased mechanical linkage comprises;
 a. a scale beam,
 b. an adjustable fulcrum for said beam,
 c. spring-biasing means exerting a force in one direction on one end of said scale beam to effect rocking thereof in one direction,
 d. a force-transmitting member so disposed that one end thereof abuts said scale beam adjacent its other end,
 e. a lever pivotally mounted intermediate its ends adjacent the other end of said force-transmitting member, said lever being so disposed with respect to said interlocking means and said first and second valve means as to enable successive shifting of said first and second valve means in response to a first and a second degree of force transmitted to said lever by said force-transmitting member, and f. fluid-pressure-controlled force-transmitting means for exerting a variable force on said one end of said scale beam in a direction opposite said one direction, a reduction in the degree of force transmitted by said force-transmitting means to said one end of said scale beam enabling said spring-biasing means to exert a force in said one direction on said one end of said scale beam to effect rocking thereof in said one direction.

17. A combined fluid pressure and spring-applied brake apparatus, as recited in claim 1, further characterized in that said operator-controlled electro-pneumatic means comprises;

a. a fluid motor so arranged as to act in opposition to said spring-biased mechanical linkage whereby variations in the fluid pressure force exerted by said motor enables said spring-biased mechanical linkage to transmit a force for effecting successive shifting of said first and second value means from their said one to their said second positions, b. conduit means through which fluid under pressure may flow from said source of fluid under pressure to said fluid motor to increase the pressure of fluid therein, c. a bushing through which fluid under pressure may be released from said conduit means to atmosphere, d. an element movable toward and away from one end of said bushing to effect variations in the rate of flow of fluid under pressure from said conduit to atmosphere thereby effecting corresponding variations in the pressure of the fluid in said fluid motor, and e. an operator-controlled solenoid having an armature plunger for transmitting force to said movable element and a coil variation in the current in which, under the control of an operator, provides for said armature plunger transmitting a corresponding force to said element thereby enabling the cooperation between said element and said bushing to constitute a variable area choke through which fluid under pressure is released from said conduit means to atmosphere to control variations in the pressure of fluid in said fluid motor.

18. For use with a brake cylinder having a body provided with a bore in which is slidably mounted a piston and a service brake-applying spring interposed between said body and one side of said piston for effecting a service brake application upon the release of fluid under pressure from the other side of said piston, a brake control valve device comprising;

a. a first mechanically-operated fluid-pressure-released valve means having one position in which fluid under pressure can flow from a source of fluid under pressure to the other side of said piston to establish thereon a fluid pressure force to effect a brake release, and shiftable to a second position in which fluid under pressure is released from said other side of said piston to atmosphere to reduce said fluid pressure force thereby enabling said brake-applying spring to transmit, via said piston, a service brake-applying force variable in degree in accordance with the reduction in the degree of said fluid pressure force, b. a second mechanically-operated fluid-pressure-released valve means having one position in which fluid under pressure is released from said one side of said piston, and shiftable to a second position in which fluid under pressure can flow from a source of fluid under pressure to said one side of said piston to establish thereon a fluid pressure force which, in response to the flow of fluid under pressure from said other side of said piston to atmosphere in response to the shifting of said first valve means to its said second position, acts cojointly with said spring on said one side of said piston to transmit, via said piston, an emergency brake-applying force that exceeds in degree the maximum service brake-applying force obtainable solely from said spring, c. a spring-operated mechanical linkage, for effecting mechanical operation of said first and second mechanically-operated fluid-pressure released valve means, d. interlocking means so cooperating with said mechanical linkage and said first and second valve means as to preclude operation of said second valve means prior to operation of said first valve means to release all fluid under pressure from said other side of said piston, e. fluid-pressure-operated means for rendering said spring-operated mechanical linkage operable or inoperable to establish a force for effecting mechanical operation of said first and second mechanically-operated fluid-pressure-released valve means, f. a pair of differential-type fluid motors each operable upon the supply of fluid under pressure thereto to shift a corresponding one of said valve means to its said one position, g. operator-controlled means for so varying the pressure of fluid established in said fluid-pressure-operated means as to render said spring-operated mechanical linkage operable to establish an operating force for operating said first and said second valve means from their said first to their said second positions that is inversely proportional to the pressure of the fluid in said fluid-pressure-operated means, and h. a pair of electro-mechanical means each operable to control the supply and release of fluid under pressure to and from a corresponding one of said pair of differential-type fluid motors whereby each of said differential-type fluid motors is effective, so long as fluid under pressure is supplied thereto by its corresponding electro-mechanical means, to prevent operation of the corresponding one of said valve means from its said one to its said second position by said spring-operated mechanical linkage notwithstanding operation of said operator-controlled means as to so vary the pressure of fluid in said fluid-pressure-operated means as to render said spring-operated mechanical linkage operable to establish an operating force for operating said valve means from their said one to their said second position.

19. A brake control valve device, as recited in claim 18, further characterized in that said first mechanically-operated fluid-pressure-released valve means comprises;

a. biasing means normally effective to maintain said first valve means in its said one position in which fluid under pressure flows from a source of fluid under pressure to said other side of the piston of the brake cylinder and yieldingly resists shifting of said first valve means from its said one position to its said second position by said spring-operated mechanical linkage, and b. abutment means subject on one side to said biasing means and on the other side to the fluid under pressure delivered by said first valve means, while in its said one position, to said other side of said piston whereby a reduction in the pressure of fluid on said other side of said piston and the other side of said abutment means responsive to shifting of said first valve means to its said second position by said spring-operated mechanical linkage renders said biasing means effective to establish a force substantially equal in magnitude and opposite in direction to the force transmitted by said spring-operated mechanical linkage to said first valve means whereby this force established by said biasing means shifts said first valve means from its said second position to a third position in which fluid under pressure is trapped on the other side of said piston thus enabling self-lapping operation of said first valve means to control the pressure of fluid on the other side of said piston.

20. A brake control valve device, as recited in claim 18, further characterized in that said second mechanically-operated fluid-pressure released valve means comprises;

a. a spool-type valve, and
b. biasing means acting on one end of said spool valve to normally maintain it in its said one position in which fluid under pressure is released from said one side of the piston of the brake cylinder and effective to yieldingly resist shifting of said spool valve by said spring-operated mechanical linkage from its said one position to its said second position in which fluid under pressure can flow from a source of fluid under pressure to said one side of said piston and said one end of said spool valve whereby the fluid under pressure supplied to said one end establishes a fluid pressure force that acts cojointly with the force of said biasing means to shift said spool valve from its said second position to a third position in which flow of fluid under pressure from a source of fluid under pressure to said one end of said spool valve is cut off thus enabling self-lapping operation of said second valve means.

21. A brake control valve device, as recited in claim 18, further characterized in that said spring-operated mechanical linkage comprises:

a. a scale beam,
b. an adjustable fulcrum for said scale beam,
c. a plurality of Belleville springs so arranged in a stack as to exert a force in one direction on one end of said scale beam to effect rocking thereof in one direction,
d. a force-transmitting member so disposed that one end thereof abuts said scale beam adjacent its other end, and
e. a lever pivotally mounted intermediate its ends adjacent the other end of said force-transmitting member, said lever being so disposed with respect to said first and second valve means as to effect shifting of said first and said second valve means from their first to their said second positions accordingly as said lever is rocked in one direction or an opposite direction, said lever so cooperating with said interlocking means as to preclude shifting of said second valve means from its first position to its second position prior to shifting of said first valve means from its first position to its second position.

22. A brake control valve device, as recited in claim 18, further characterized in that said interlocking means comprises;

a. a pivoted lever interposed between said first and second valve means and said spring-operated mechanical linkage through which said linkage effects mechanical operation of said valve means, and
b. biasing means so disposed with respect to said lever and said second valve means as to prevent rocking of said lever in one direction by said linkage to mechanically operate said second valve means from its first to its second position prior to rocking of said lever in an opposite direction by said linkage to mechanically operate said first valve means from its first to its second position.

23. A brake control valve device, as recited in claim 18, further characterized in that said fluid-pressure-operated means for rendering said spring-operated mechanical linkage operable or inoperable comprises;

a. a fluid motor so arranged as to provide a fluid pressure force that acts in opposition to said spring-operated mechanical linkage while fluid under pressure is supplied thereto whereby a reduction in the pressure of said fluid effects a corresponding reduction in said fluid pressure force to thereby enable said spring-operated mechanical linkage to transmit a corresponding force for effecting mechanical operation of said first and second mechanically-operated fluid-pressure released valve means, and
b. conduit means through which fluid under pressure may be supplied from a source of fluid under pressure to said fluid motor.

24. A brake control valve device, as recited in claim 18, further characterized in that each of said pair of differential-type fluid motors comprises;

a. a first abutment having a certain effective area,
b. a second abutment oppositely arranged with respect to said first abutment and having an effective area that is less than said certain effective area of said first abutment, said first and second abutments being so spaced-apart that their adjacent sides form therebetween a first chamber to which fluid under pressure is supplied to establish therein a certain chosen pressure that is effective to cause shifting of the corresponding one of said valve means to its said one position, and
c. a third abutment oppositely arranged with respect to said second abutment and having the same effective area as said second abutment, said second and third abutments being so spaced apart that their adjacent side form therebetween a second chamber that is constantly open to atmosphere, the other side of said third abutment being subject to the pressure of the fluid delivered by the respective valve means whereby, upon a reduction of said chosen pressure in said first chamber to enable mechanical operation of the respective valve means from its said one position to its said second position by said spring-operated mechanical linkage a corresponding variation of pressure is effected on said other side of said third abutment to enable self-lapping operation of the respective valve means.

25. A brake control valve device, as recited in claim 18, further characterized in that said operator-controlled means for varying the pressure of fluid established in said fluid-pressure-operated means comprises;

a. conduit means through which fluid under pressure can flow from a source of fluid under pressure to said fluid-pressure-operated means,
b. a bushing through which fluid under pressure may be released from said conduit means to atmosphere,
c. an element movable toward and away from one end of said bushing to effect variations in the rate of flow of fluid under pressure from said conduit means to atmosphere thereby effecting corresponding reductions in the pressure of fluid in said fluid-pressure-operated means, and
d. a solenoid having an armature plunger for transmitting force to said movable element and a coil connectable to an electric circuit in which the degree of current flowing is selectable by an operator whereby a reduction in which the current flowing through said electric circuit effects a corresponding reduction in the force transmitted to said element by said armature plunger thereby enabling the cooperation between said element and said bushing to constitute a variable area choke through which fluid under pressure is released from said conduit means to atmosphere to reduce the pressure of fluid in said fluid-pressure-operated means.

26. A brake control valve device, as recited in claim 18, further characterized in that said pair of electromechanical means each comprises;
a. conduit means through which fluid under pressure can flow from a source of fluid under pressure to the corresponding one of said differential-type fluid motors,
b. a bushing through which fluid under pressure may be released from said conduit means to atmosphere,
c. an element movable toward and away from one end of said bushing to effect variations in the rate of flow of fluid under pressure from said conduit means to atmosphere thereby effecting corresponding reductions in the pressure of fluid in the respective one of said differential-type fluid motors, and
d. a solenoid having an armature plunger for transmitting force to said movable element and a coil connectable to an electric circuit through which current may flow whereby a reduction in the current flowing through said electric circuit effects a corresponding reduction in the force transmitted to said element by said armature plunger thereby enabling the cooperation between said element and said bushing to constitute a variable area choke through which fluid under pressure is released from said conduit means to atmosphere to reduce the pressure of fluid in the corresponding one of said differential-type fluid motors.

* * * * *

UNITED STATES PATENT AND TRADEMARK OFFICE
CERTIFICATE OF CORRECTION

PATENT NO. : 4,045,093
DATED : August 30, 1977
INVENTOR(S) : Robert J. Bridigum

It is certified that error appears in the above-identified patent and that said Letters Patent are hereby corrected as shown below:

Column 24, lines 38 to 41, delete "[one direction and shifting of said second valve means from its one position to its second position in response to rocking of said lever]"

Column 25, line 21, "value" should be --valve--

Column 28, line 53, "side" should be --sides--

Column 29, line 19, erase "which"

Signed and Sealed this

Twenty-fifth Day of April 1978

[SEAL]

Attest:

RUTH C. MASON
Attesting Officer

LUTRELLE F. PARKER
Acting Commissioner of Patents and Trademarks